United States Patent [19]

Hoopman

[11] Patent Number: 5,439,621
[45] Date of Patent: * Aug. 8, 1995

[54] METHOD OF MAKING AN ARRAY OF VARIABLE FOCAL LENGTH MICROLENSES

[75] Inventor: Timothy L. Hoopman, River Falls, Wis.

[73] Assignee: Minnesota Mining and Manufacturing Company, St. Paul, Minn.

[*] Notice: The portion of the term of this patent subsequent to Apr. 5, 2011 has been disclaimed.

[21] Appl. No.: 164,310

[22] Filed: Dec. 8, 1993

Related U.S. Application Data

[63] Continuation of Ser. No. 46,067, Apr. 12, 1993, abandoned.

[51] Int. Cl.6 .............................. B29D 11/00
[52] U.S. Cl. ..................... 264/2.5; 264/1.7; 264/1.9; 425/808
[58] Field of Search ............ 264/1.7, 1.9, 2.5, 1.4; 425/808

[56] References Cited

U.S. PATENT DOCUMENTS

| | | | |
|---|---|---|---|
| 2,854,337 | 9/1958 | Pearson | 264/2.5 |
| 4,243,618 | 1/1981 | Van Arnam | 264/2.5 |
| 4,478,769 | 10/1984 | Pricone et al. | 264/1.9 |
| 4,528,260 | 7/1985 | Kane . | |
| 4,952,036 | 8/1990 | Gulick et al. . | |
| 5,052,783 | 10/1991 | Hamada . | |
| 5,126,863 | 6/1992 | Otsuka et al. . | |
| 5,225,935 | 7/1993 | Watanabe et al. | 264/2.5 |
| 5,298,366 | 3/1994 | Iwasaki et al. | 264/2.5 |
| 5,300,263 | 4/1994 | Hoopman et al. | 264/2.5 |

FOREIGN PATENT DOCUMENTS

| | | |
|---|---|---|
| 0426441A2 | 5/1991 | European Pat. Off. . |
| 0444872A2 | 9/1991 | European Pat. Off. . |
| 0450780A2 | 10/1991 | European Pat. Off. . |
| 0534426A2 | 3/1993 | European Pat. Off. . |
| 58-29628 | 2/1983 | Japan ............... 264/2.5 |
| 61-92452 | 5/1986 | Japan ............... 264/2.5 |
| 61-98518 | 5/1986 | Japan ............... 264/2.5 |
| 2-257119 | 10/1990 | Japan . |

OTHER PUBLICATIONS

"Microlens Arrays for Solar Astrometry" by Guy Artzner, *Microlens Arrays*, M. C. Hutley, editor, May 1, 1991, pp. 91–96.

"Fabrication and Testing of Monolithic Lenslet Module (MLM) Arrays," by D. D'Amato et al., *Optical Fabrication and Testing*, 1990 Technical Digest Series, vol. 11, Optical Society of America, Jun. 12, 1990.

"Micro-Optics: Monolithic Lenslet Modules" sales brochure from United Technologies Adaptive Optics Assoc., Cambridge, Mass., Jun. 1992.

*Primary Examiner*—Mathieu D. Vargot
*Attorney, Agent, or Firm*—Gary L. Griswold; Walter N. Kirn; Eric D. Levinson

[57] ABSTRACT

A method of making a microlens array where the microlenses have focal lengths which vary as a function of their geometric position in the array. The focal lengths of the microlenses at the center of the array are shorter than the microlenses at the periphery.

8 Claims, 6 Drawing Sheets

METHOD OF MAKING AN ARRAY OF VARIABLE FOCAL LENGTH MICROLENSES

This is a continuation of application Ser. No. 08/046,067 filed Apr. 12, 1993, now abandoned.

FIELD OF THE INVENTION

The present invention relates to microlens arrays.

BACKGROUND OF THE INVENTION

A microlens array is a group of lenses arranged two-dimensionally and having a center to center spacing of less than about 2 mm. Microlens arrays have various uses as described in European Patent Application 0,426,441 A2, including: (1) to intensify luminance by focusing light through picture elements in non-luminant display devices such as liquid crystal display devices; (2) as a light pickup means such as a laser disc, compact disc, or optical magnetic disc; (3) as a focusing means for coupling a luminant device or a receptive device to an optical fiber; (4) as a focusing means or an image forming means for focusing incident light in a photoelectric converting zone so as to increase the sensitivity of a primary image sensor used in a solid state image device such as a charge coupled device (CCD) or facsimile machine; (5) as an image forming means for forming an image on a sensitive medium to be printed on by a liquid crystal printer or an LED printer; and (6) as a filter for treating photo-information.

Liquid crystal displays are comprised of a large number of pixels, i.e., picture elements, which are display units arranged regularly between two optically transparent substrates. Images formed in the image plane of a liquid crystal display can be projected onto a screen by shining light through the display toward a projection lens. Such projection systems commonly suffer from a low brightness level because much of the light is lost in the display and never reaches the projection lens. It is known that microlens arrays can be provided on a liquid crystal display to improve the brightness of the projected image.

U.S. Pat. No. 5,052,783 (Hamaria) discloses a projection type image display apparatus which sandwiches a liquid crystal display between a pair of microlens arrays. The microlenses in the arrays are positioned so that light rays entering through the center of a given lens in one array pass through the center of a pixel in the liquid crystal display and exit through the center of a microlens in the other array.

SUMMARY OF THE INVENTION

The present inventors have discovered that the brightness of an image projected by a display apparatus, such as disclosed in U.S. Pat. No. 5,052,783, can be significantly improved by the use of a microlens array where the focal lengths of the lenses at the center of the array are shorter than the focal lengths of the microlenses at the periphery of the array.

To the knowledge of the inventors, no such array has been made, due in part to the difficulty inherent in fabricating an array having thousands of lenses having different focal lengths. The apparent lack of art relating to variable focal length microlens arrays may also be due to a lack of appreciation by those skilled in the art of the benefits that such an array could provide.

Accordingly, the invention includes a microlens array wherein the focal lengths of the microlenses vary as a function of their geometric position in the array. More preferably, the focal lengths of the microlenses at the periphery of the array differ from the focal lengths of the microlenses at the center of the array. Most preferably, the focal lengths of the microlenses at the center of the array are shorter than the focal lengths of the lenses at the periphery of the array.

The invention includes a method for making a microlens array mold capable of forming the array described above. The method includes forming an array of receptacles having varying depths and applying a shrinkable, hardenable liquid over the array, thereby forming a meniscus in each receptacle. As the liquid shrinks and hardens, it forms a concave surface in each receptacle. This shrinkage will form deeper concave surfaces in the deeper receptacles, and shallower concave surfaces in the shallower receptacles. Thus, the method forms a mold capable of forming an array of microlenses having differing focal lengths. A microlens array can be formed by applying a lens forming material to the mold.

BRIEF DESCRIPTION OF THE DRAWINGS

The present invention will be further described with reference to the accompanying drawings wherein like reference numerals refer to like parts in the several views, and wherein.

DETAILED DESCRIPTION

Figure 1:
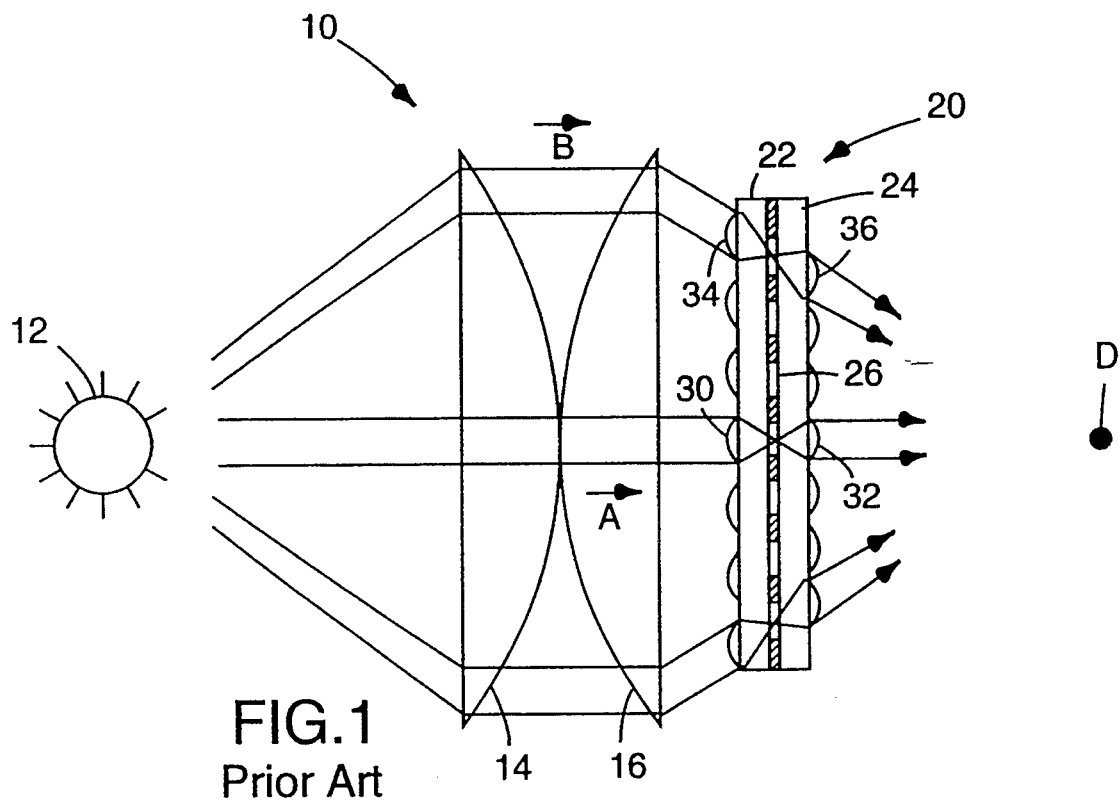
FIG. 1 is a schematic side view of a prior art projection system.
Figure 6:
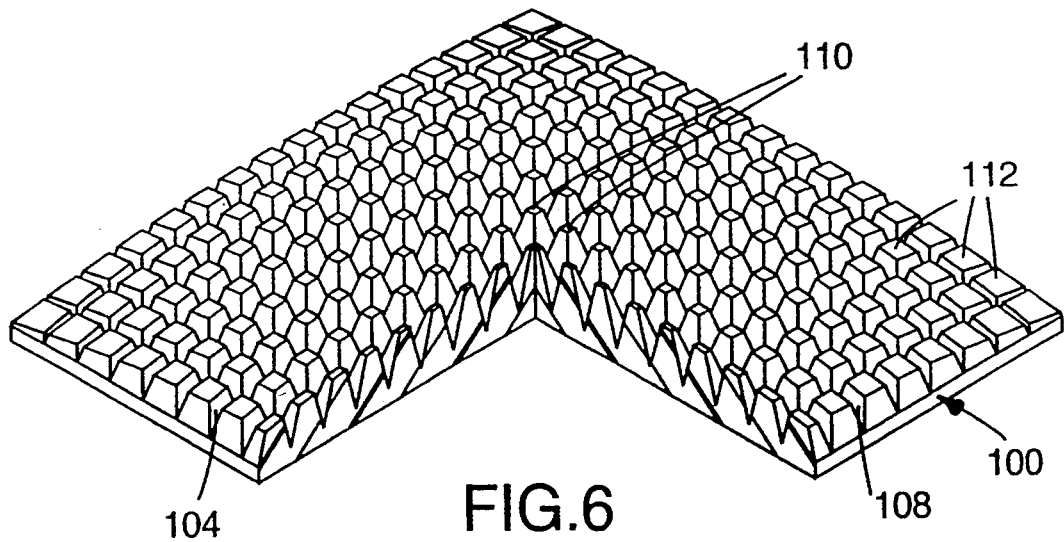
FIG. 6 is a perspective view having parts broken away and in section of the substrate shown in FIG. 5 having a second plurality of parallel grooves intersecting the first plurality of grooves.

A light my diagram 10 resembling FIG. 6 of U.S. Pat. No. 5,052,783 is shown in FIG. 1. The diagram 10 shows light rays A and B passing through a cross-section of a liquid crystal display 20. The liquid crystal display 20 is comprised of a plurality of pixels 26 arranged regularly between two optically transparent substrates 22 and 24. Light rays, including rays A and B, are emitted from a light source 12, and pass through a collimating lens 14 and a converging lens 16. The light rays then converge towards the liquid crystal display 20 which is sandwiched between two microlens arrays. The light rays converge at point D on the other side of the display 20.

Substantially collimated light rays A approach a microlens 30 positioned at the approximate center of the microlens array (and thus the center of the display 20) at an angle approximately normal to the plane of the display 20. The light rays A are then focused toward a pixel 26. The light rays A then diverge until they are re-collimated by microlens 32 positioned on the other side of the array 20 and directed toward the point D.

Substantially collimated light rays B approach a microlens 34 positioned toward the periphery of the microlens array (and thus the periphery of the display 20) at an angle that is not approximately normal to the plane of the display 20. The ray diagram drawn in FIG. 6 of U.S. Pat. No. 5,052,783 (and thus the diagram 10 shown in FIG. 1 herein) implies that light rays B will be focused at a pixel 26 before diverging and being re-collimated by the microlens 36 positioned on the other side of the array. The inventors have discovered that the light rays B will not be properly focused at the center of a pixel 26 for two reasons.

First, unlike the rays A passing through the center of the display 20, the rays B passing through the periphery of the microlens array do not pass straight through the display at an angle perpendicular to the plane of the array. Thus, in order for rays B to reach the pixels 26 in the display 20, the rays B must travel a longer distance than rays A. Thus, if the microlens 34 has the same focal length as the microlens 30, the rays B will be focused to a point before they reach a pixel 26.

Second, because the light rays B do not approach the microlens 34 at an angle normal to the plane of the microlens array, the light rays B enter the microlens 34 "off" of the optical axis of the lens. As shown in ray diagram 40 in FIG. 2, light rays E entering a microlens 42 at an angle of 22° from the normal will be focused at a shorter distance from the microlens than light rays G passing through the center of the microlens.

Figure 2:
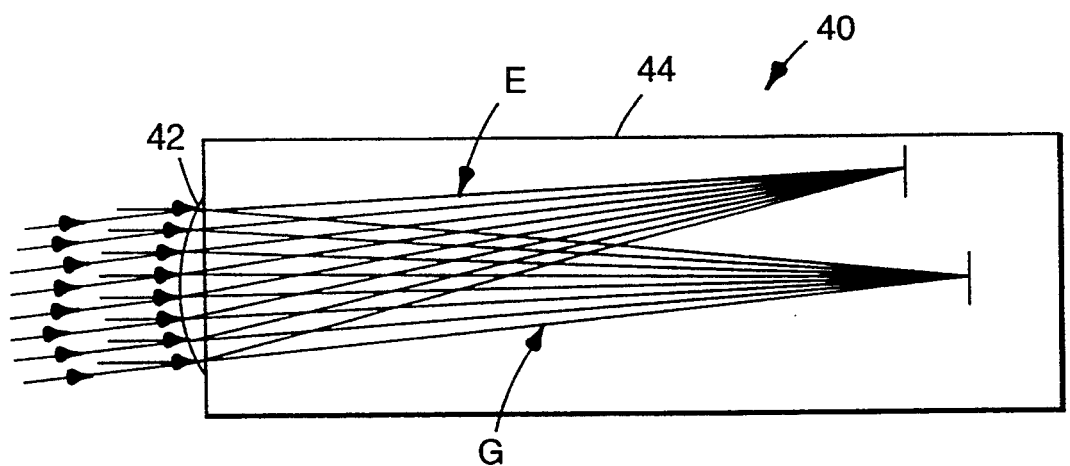
FIG. 2 is a ray diagram showing the change in focal length of a microlens for light which enters the lens off-axis.

In the ray diagram 40 shown in FIG. 2, the lens 42 represents a microlens having a radius of curvature of 0.445 mm and a thickness of 0.178 min. The lens 42 is affixed to a refractive index matching material 44. The light rays G simulate light rays passing through the center of a liquid crystal display. The light rays E simulate light rays passing through a comer of a liquid crystal display having dimensions of 15.2 cm by 20.3 cm for use with an overhead projector having a focal length of 30.5 cm. The calculated focal length for the microlens 42 for light rays G entering normal to the lens was 1.29 mm. The calculated focal length for the microlens 42 for light rays E entering the lens at an angle of 22° was 1.14 mm, a difference of 12%. Even if the material 44 has an index of refraction Which differs from that of the lens 42, the focal length of the off axis rays E will still be shorter than that of on axis rays G.

Accordingly, the invention provides a microlens array wherein the focal lengths of the individual microlenses can be varied to compensate for the two phenomena described above. Because both phenomena tend to cause the microlenses at the periphery of the array to focus light to a point before reaching the pixels, those microlenses should be made to have a focal length that is longer than the focal length of lenses positioned at the center of the array. Accordingly, microlenses located at the center of the array should have a smaller radius of curvature than microlenses positioned at the periphery of the array.

Figure 3:
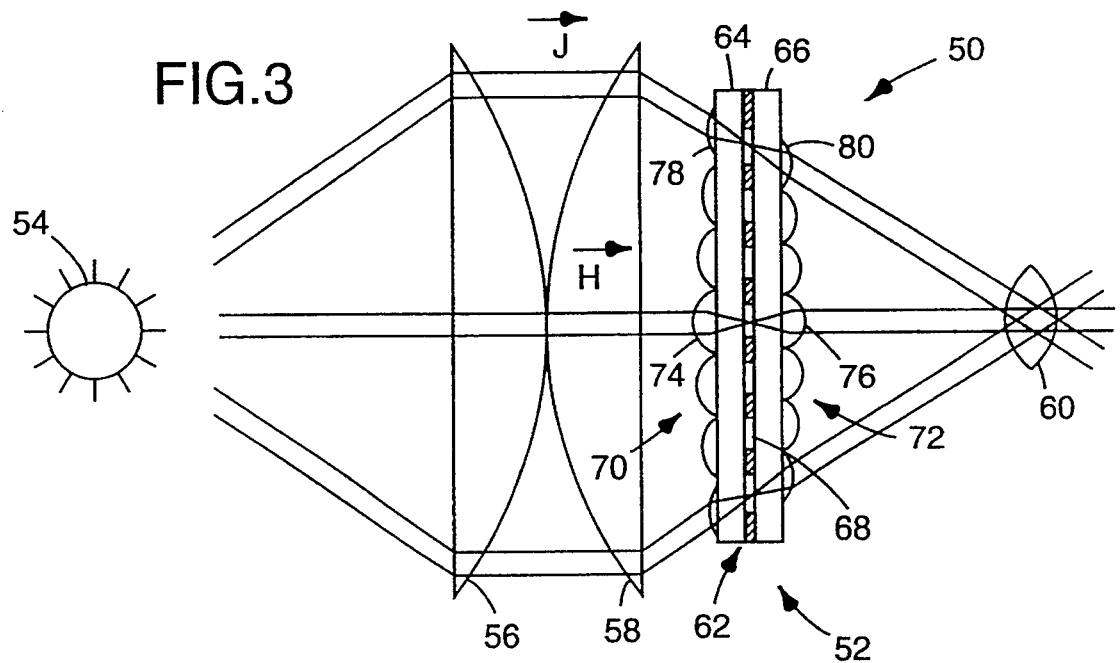
FIG. 3 is a side view of a projection system according to the invention.

A projection system 50 according to the invention is shown in FIG. 3. The system 50 is comprised of a projection panel 52, a light source 54, a collimating lens 56, a converging lens 58, and a projection lens 60. Light rays, including rays H and J, are emitted from a light source 54, and pass through the collimating lens 56 and the converging lens 58. The light rays then pass through the projection panel 52 and converge at the projection lens 60, so that an image in the image plane of the projection panel can be projected onto a screen (not shown).

The projection panel 52 is comprised of an image display panel 62 and at least one microlens array 70 provided on one of the major surfaces of the display panel 62. More preferably, microlens arrays 70 and 72 are provided on the opposing major surfaces of the display panel 62. The image display panel 62 is comprised of a plurality of pixels 68 arranged regularly between two optically transparent substrates 64 and 66. The image display panel 62 is preferably a liquid crystal display, but it can be any type of pixel-based image display panel.

The center of the microlens array 70 is preferably aligned with the center of the image display panel 62, as is the microlens array 72. As used herein, the word "center" when used with reference to a microlens array means the optical center, which is the point where light rays from a light source are normal to the surface of the array and are thus parallel to the optical axis of a microlens in the array.

Light rays H pass through the center of the image display panel 62 and through microlenses 74 and 76 positioned at the center of the arrays 70 and 72, respectively. Light rays J pass through the periphery of the image display panel 62 and through microlenses 78 and 80. As can be seen from FIG. 3, the radius of curvature for the microlenses is smallest for the center lenses 74 and 76, and gradually increases towards the periphery of the array, where the radius of curvature reaches a maximum at the microlenses 78 and 80. (Note that this effect is exaggerated in FIG. 3.) Thus, the focal lengths of the microlenses located towards the periphery of the array is greater than those of the lenses positioned at the center of the array, thereby providing proper focus of all light rays at pixels 68 and proper re-collimation of the light rays after they exit the microlens array 72.

The focal length of each microlens in the arrays 70 and 72 should increase as a function of the angle of incidence of the light rays originating from the light source 54. Assuming circular symmetry, the focal lengths of the microlenses should increase as a function of the distance from each microlens to the center of the array. If the microlens array is in the shape of a circle, then all of the lenses on the circumference of the array should have the same focal length, assuming circular symmetry. If, however, the array is in the shape of a rectangle, which is preferable, then the microlenses along the shorter sides of the array will, on average, have longer focal lengths than the microlenses on the longer sides because the lenses on the shorter side are further from the center of the array (again, assuming circular symmetry). Furthermore, the microlenses having the longest focal lengths will be those which are located at the corners of the array. In the absence of circular symmetry, the focal lengths of the microlenses can be varied as a function of their geometric position in the array to properly focus the image.

The projection panel 52 can be used as a portable display device which can be placed on the image plane of a projector such as an overhead projector. In the alternative, the projection panel 52 can be built-in to the projection system 50 as a permanent unit.

Microlens arrays can include hundreds, thousands, and even a million or more microlenses. For example, an array of microlenses having dimensions of 12.5 cm by 18.75 cm and consisting of microlenses having a center to center spacing of 0.25 mm would require the creation of 375,000 microlenses. Such an array can be especially difficult to make if one desires to vary the focal lengths of the microlenses as a function of their geometric position in the array.

Figure 4:
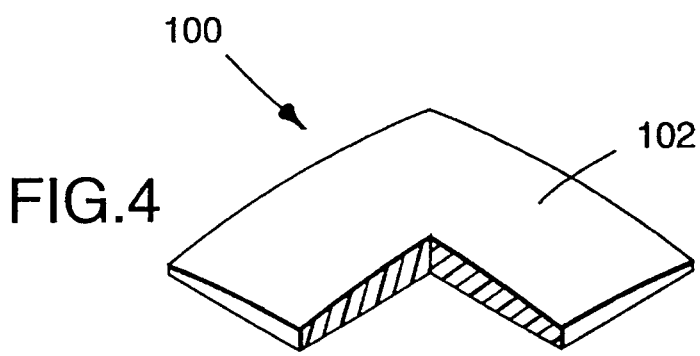
FIG. 4 is a perspective view having parts broken away and in section of a substrate having a raised surface at its center according to the invention.

A microlens array for use in the invention can be made by performing the following steps. A substrate 100 having a raised surface 102 in its center is shown in FIG. 4. The substrate 100 is preferably comprised of any material that is susceptible to the diamond turning process, such as hard copper, although an acrylic or other engineering polymer could also be used.

The shape of the raised surface 102 can be chosen to lead to the desired variation in the microlens focal lengths across the microlens array to be formed. The raised surface 102 shown in FIG. 4 will create a microlens array having microlenses which have shorter focal lengths at the center of the array than at the periphery of the array.

By changing the shape of the surface 102, it is possible to vary the focal lengths of the microlenses in the array at virtually any desired geometric position in the array. If, for example, the raised surface 102 were reversed so as to form a bowl-shaped surface, the resultant microlenses would have shorter focal lengths at the periphery of the array than at the center of the array.

Figure 5:
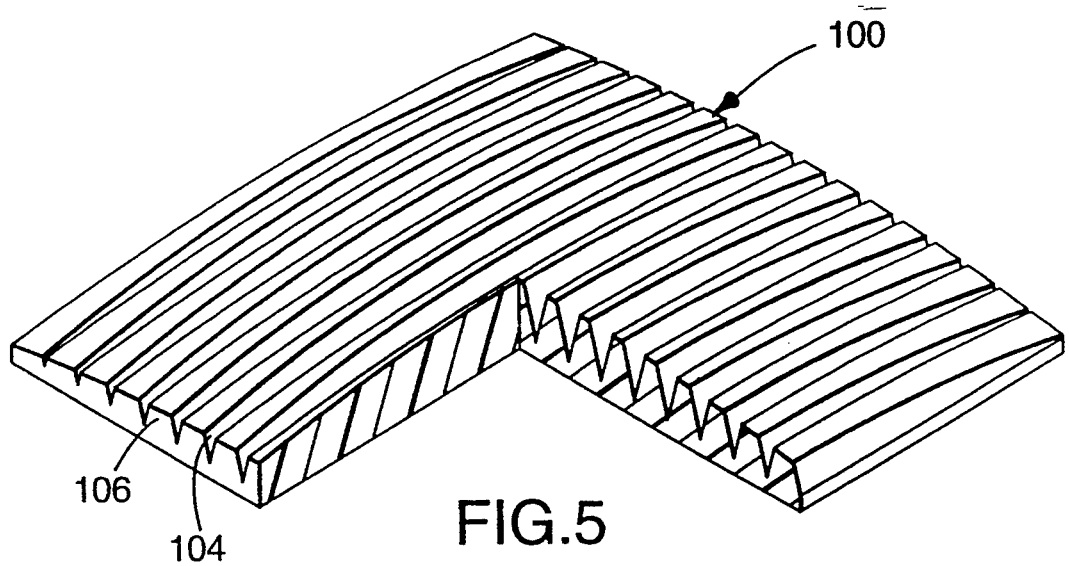
FIG. 5 is a perspective view having parts broken away and in section of the substrate of FIG. 4 having a first plurality of parallel grooves according to the invention.

A plurality of grooves 104 is then cut into the substrate 100, as shown in FIG. 5, by a machining process, such as diamond turning, forming a plurality of ridges 106. The grooves 104 are preferably, although not necessarily, straight and parallel to each other. The grooves 104 are shown to have V-shaped bottoms although other shapes are possible. However, the bottoms of the grooves 104 must be co-planar.

A second plurality of grooves 108 is then similarly machined into substrate 100 so that the grooves 108 intersect the grooves 104, forming a plurality of protrusions, as shown in FIG. 6. The grooves 108 must be co-planar with the grooves 104. As in the case of the grooves 104, the grooves 108 are preferably, although not necessarily, straight and parallel to each other. And as in the case of the grooves 104, the grooves 108 have V-shaped bottoms, although other shapes are possible.

Protrusions of varying shapes are formed between the grooves 104 and 108. The protrusions closest to the highest point of the surface 102, i.e., the center, can resemble pyramids 110. The protrusions furthest away from the center, e.g., at the sides and particularly at the corners, will be flat-topped pyramids 112. The distance between adjacent grooves 104 need not be equal to the distance between adjacent grooves 108.

Figure 7:
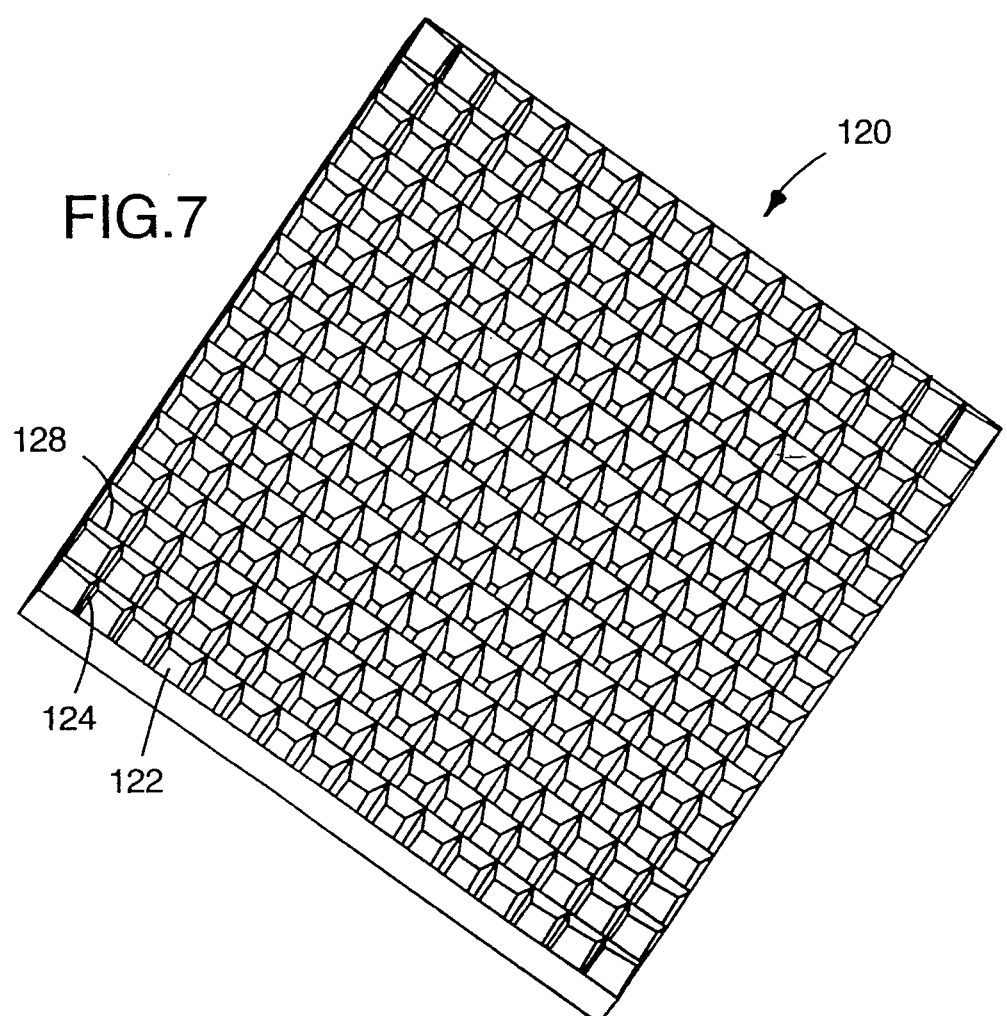
FIG. 7 is a perspective view of a negative replica of the substrate shown in FIG. 6.

A negative replica of the surface 102 of the substrate 100 having the two sets of parallel grooves 104 and 108 is then produced, preferably by electroforming, thereby creating a negative replica 120, as shown in FIG. 7. The replica 120 has a plurality of pyramidal receptacles 122, corresponding to the protrusions 110 and 112. The receptacles 122 located towards the center of the negative replica 120 tend to have deeper, pointed bottoms, while the receptacles toward the edges of the replica tend to have shallower, flat bottoms. The receptacles 122 have rectangular apertures and are separated by walls 124 and 128, which correspond to the grooves 104 and 108, respectively, of FIG. 6. The tops of the walls 124 and 128 are co-planar.

Figure 8:
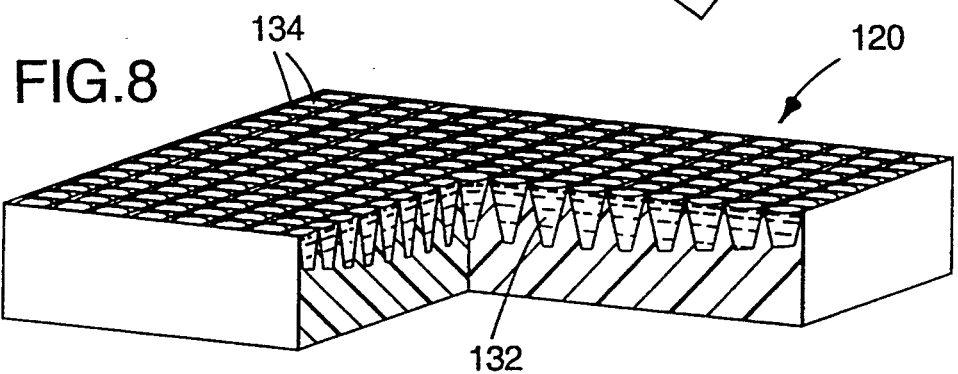
FIG. 8 shows a perspective view having pans broken away and in section of the substrate shown in FIG. 7 wherein the receptacles are filled with a liquid according to the invention.

A shrinkable, hardenable liquid 132 is then applied to the surface of the negative replica 120 having pyramidal receptacles 122. The receptacles 122 are shown in cross-section in FIG. 8 filled with the liquid 132. The volume of the liquid 132 which enters the receptacles 122 can be controlled by sliding a squeegee across the surface of the replica 120. The liquid 132 can also be controllably applied by other coating techniques, such as by the use of a roller. The receptacles 122 should be substantially filled, thereby forming a meniscus 134 in each receptacle.

Figure 9:
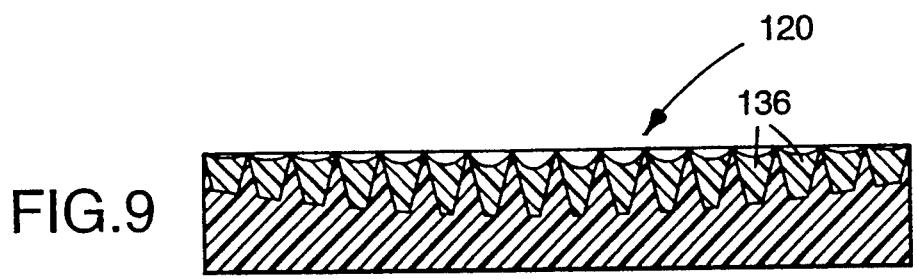
FIG. 9 is a cross-sectional view of the hardened liquid in the receptacles according to the invention.

The liquid 132 is then hardened, as shown in cross-section in FIG. 9. As the liquid 132 hardens, it simultaneously shrinks. In the alternative, shrinking and hardening may take place in separate steps. As the liquid 132 in each receptacle 122 shrinks, its level in each receptacle lowers, thereby forming a meniscus having a smaller radius of curvature than the liquid meniscus 134. The level of liquid 132 in deeper receptacles 122 will fall further than the level of liquid 132 in shallower receptacles (assuming that the other dimensions of the receptacles are similar) because there is a larger volume of liquid in the deeper receptacles. Thus, although the percentage shrinkage is the same in both cases, the actual change in height of the liquid will be greater for the deeper receptacles. As shown in FIG. 9, the menisci of the hardened liquid 136 have a smaller radius of curvature at the center of the replica 120 than at its periphery.

Preferred materials for the liquid 132 include materials which shrink by at least 5%, and preferably about 20%, during hardening. Preferred materials for the liquid 132 also include non-shrinkable resins that are made into shrinkable liquids by diluting the resin. This diluted resin would then shrink as the diluent evaporates. A diluted non-shrinkable resin behaves differently from a shrinkable resin in that the diluted non-shrinkable resin remains a flowable liquid throughout the volume reduction process prior to hardening, while a shrinkable resin becomes increasingly less flowable during the hardening process because its viscosity is continually increasing. A shrinkable resin may be selected if increased conformance to the shape of the receptacle is desired. If such conformance is not desired, diluted resins which flow during the volume reduction process can be used because the shape of the concave surface caused by the meniscus will be relatively unaffected by the shape of the receptacle. Preferred materials for the liquid 132 include radiation curable resins, such as methacrylates, acrylates, urethane acrylates, epoxies, esters and polyester acrylates, and thermoplastics and thermosetting resins.

It is possible to make an array of convex microlenses by applying a liquid lens material (not shown) to the surface of the hardened-liquid-covered replica 120. However, the hardened-liquid 136 may not be totally compatible with the lens material. Furthermore, repeated applications of lens material to the surface in order to make additional microlens arrays can lead to degradation of the surface of the hardened liquid, resulting in the production of imperfect lenses. Thus, it is usually desirable to replicate the hardened-liquid-covered replica 120 in a harder material such as nickel, which is also compatible with most lens materials.

The replica 120 can be replicated in nickel by first metalizing the hardened-liquid-covered surface of the replica to make it electrically conductive. This can be done by depositing a layer of electroless silver (not shown) on the surface of the replica 120 by the use of a chemical reduction process.

Figure 10:
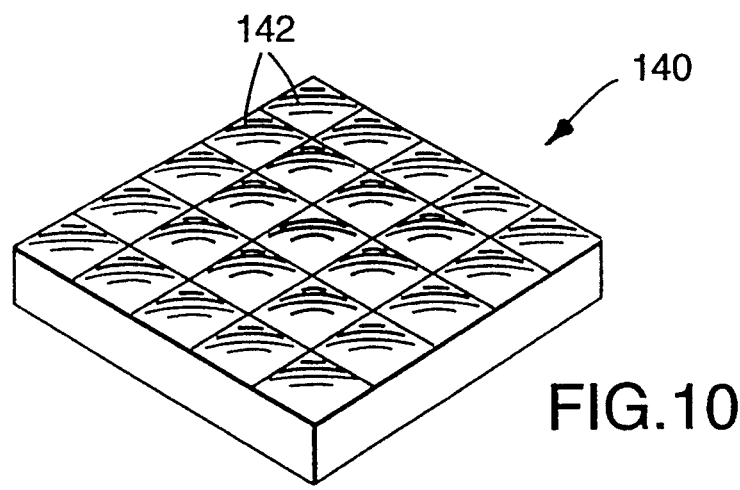
FIG. 10 is a perspective view of an electroformed nickel negative of the hardened-liquid-covered replica shown in cross-section in FIG. 9.

The metalized replica 120 can be electroformed to create a nickel negative 140 of the replica, shown in FIG. 10. The nickel negative 140 has a plurality of convex surfaces 142 corresponding to the hardened concave surfaces resulting from the hardened-liquid menisci 136 in FIG. 9. The convex surfaces 142 located toward the center of the nickel negative 140 are more raised from the surface than are the convex surfaces located toward the periphery of the negative.

Figure 11:
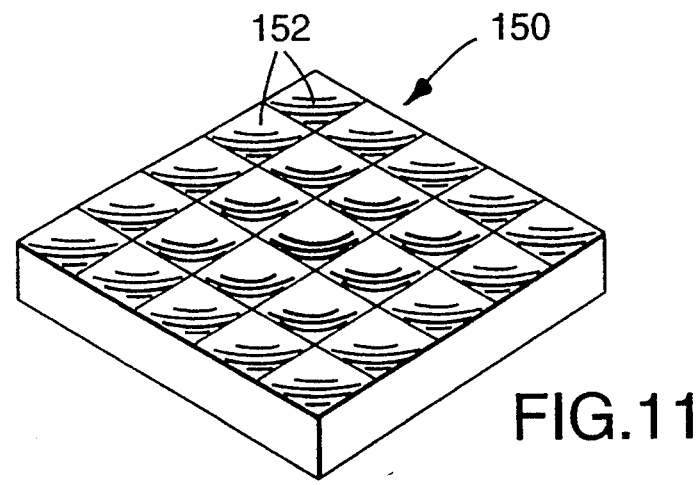
FIG. 11 is a perspective view of an electroformed nickel positive of the nickel negative shown in FIG. 10.

The nickel negative 140 can be used as a mold to create arrays of concave microlenses, or it can be electroformed in nickel to create a nickel positive 150, shown in FIG. 11. The nickel positive 150 has a plurality of concave surfaces 152 corresponding to the convex surfaces 142 in FIG. 10. The nickel positive 150 can be used in a thermal embossing process to create an array of convex microlenses. Preferred lens forming materials include optical thermoplastics such as polymethylmethacrylate, polycarbonate, polyolefin, cellulose acetate butyrate, and polystyrene. In the alternative, lens forming material may be poured onto the nickel positive 150 and cured. Preferred curable lens forming materials include optically transparent thermosetting resins such as epoxy, optically transparent radiation curable resins, such as acrylate, methacrylate, urethane acrylate, epoxy acrylate, and polyester acrylate, and perhaps glass.

The lens array is then separated from the nickel positive 150. Microlenses formed by the method of the present invention are generally spherical and preferably have a center to center spacing of less than about 2 mm, more preferably less than about 1 mm, and most preferably within the range of from about 0.05 mm to 0.5 mm.

The method of the present invention can also be used to generate generally spherical microlenses lenses having a generally triangular perimeter by providing three pluralities of intersecting grooves in the substrate 100. The third plurality of grooves should be cut to the same depth as the first two pluralities of grooves and should pass through the points of intersection of the first two pluralities of grooves. The substrate is then replicated in the same manner described above.

The lenses that are formed by the method of the present invention perform very well as spherical lenses near their centers. However, the formed lenses behave increasingly less like spherical lenses towards their perimeters. This is because the walls forming the perimeter of the individual lenses are straight and lie in a common plane, thereby forcing the lens-forming meniscus surface to deviate from a spherical shape. The amount of the error for a given square lens increases as the lens radius is made smaller.

This error may be minimized by providing arcuate grooves in the replica 120 before the resin is applied to the receptacles 122. A negative replica 160 having these additional grooves is shown in FIG. 12.

The replica 120 should be made of a material that is susceptible to diamond machining. Such materials include hard copper and epoxy and acrylic polymers. Before the arcuate grooves are machined into the replica 120, the plane formed by the tops of the walls on the replica should be extremely flat, e.g., within 1.5 $\mu$m. The receptacles may be filled with lacquer or similar removable material to support the walls during this additional cutting process. The diamond cutting tools used to make the arcuate grooves should have a cutting edge having a profile corresponding to the desired curvature of the arcuate grooves. The replica 120 may then be replicated in a hard substance, such as nickel, to form the replica 160.

Figure 12:
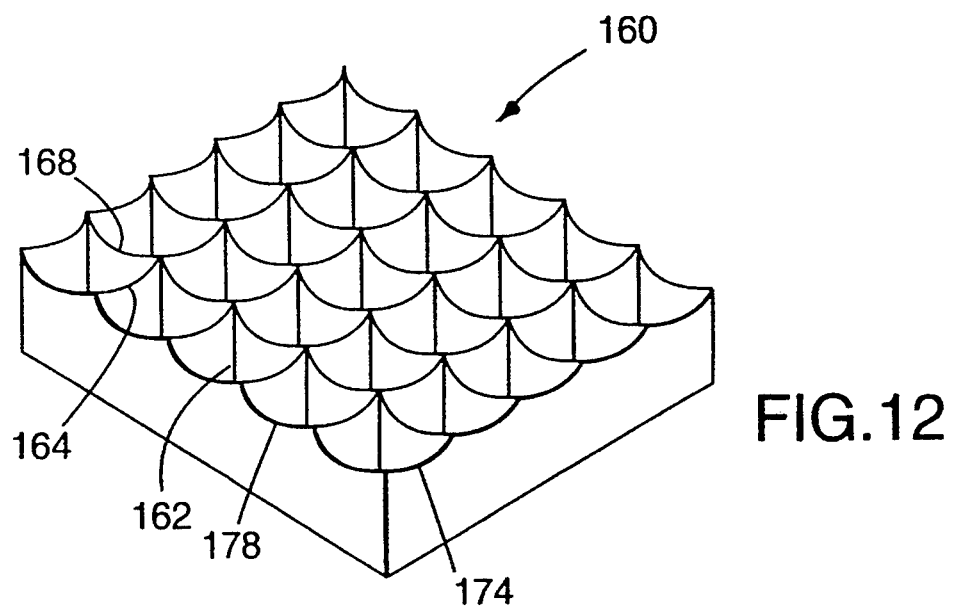
FIG. 12 is a perspective view of the replica shown in FIG. 7 having arcuate grooves in the raised walls according to another embodiment of the invention.

As shown in FIG. 12, the replica 160 has receptacles 162 formed by walls 164 and 168. The walls 164 and 168 of the replica 160 have a plurality of arcuate grooves 174 and 178. The arcuate grooves 174 are cut on a line parallel to the walls 168, which correspond to the second plurality of parallel grooves 108 in the substrate 100 shown in FIG. 6. Each arcuate groove 174 is centered between each pair of walls 168. The width of each arcuate groove 174 preferably substantially spans the distance between each pair of walls 168, which corresponds to the distance between the grooves 108. Consequently, the arcuate grooves 174 are straight and parallel to the same extent that the grooves 108 are straight and parallel.

The arcuate grooves 178 are cut on a line parallel to the walls 164 which correspond to the first plurality of parallel grooves 104 in the substrate 100 shown in FIG. 6. Each arcuate groove 178 is centered between each pair of walls 164. Each arcuate groove 178 preferably substantially spans the distance between each pair of walls 164, which corresponds to the distance between the grooves 104. The arcuate grooves 178 are straight and parallel to the same extent that the grooves 104 are. The arcuate grooves 178 will be perpendicular to the arcuate grooves 174 if the grooves 104 are perpendicular to the grooves 108.

The use of the arcuate grooves as a correction mechanism is based on the assumption that the distance between the geometric center of the receptacle aperture and a corner of that receptacle is the same for each corner of the receptacle. This is true for receptacles having apertures that are in the shape of squares, rectangles, equilateral triangles, and other regular polygons, such as equilateral hexagons, but is not true of rhombuses, parallelograms, and other irregular polygons.

The precise shape of the arcuate grooves used to enhance lens sphericity near the lens perimeter is defined by the projection of the intersection of the desired spherical lens surface with the receptacle wall into a plane which has its surface normal oriented parallel to the lengths of the arcuate grooves. A diamond tool with an elliptical profile may cut such grooves.

It should be noted that although the radius of curvature of the lenses may vary across the array, it may be difficult to vary the shape of a particular arcuate groove across the array. Thus, the shape of the arcuate groove should be chosen to yield optimum overall performance of the microlens array.

Figure 13:
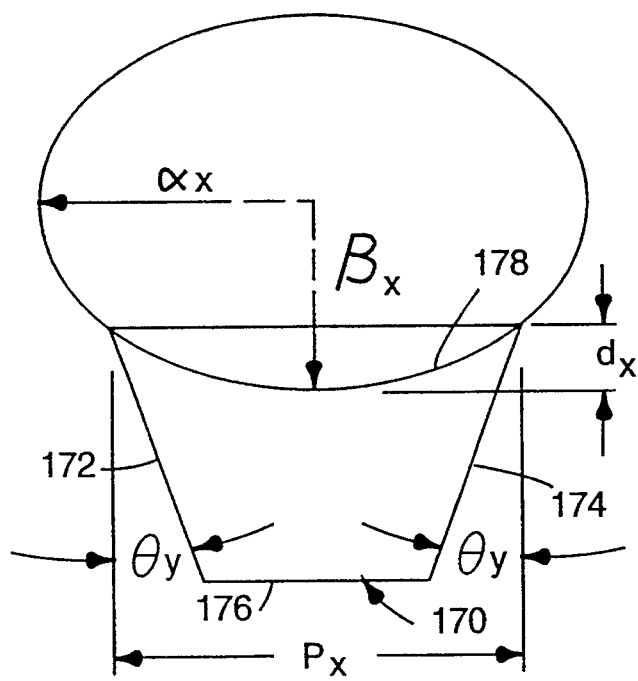
FIGS. 13 and 14 are perpendicular cross-sectional side views of a receptacle according to the present invention.
Figure 14:
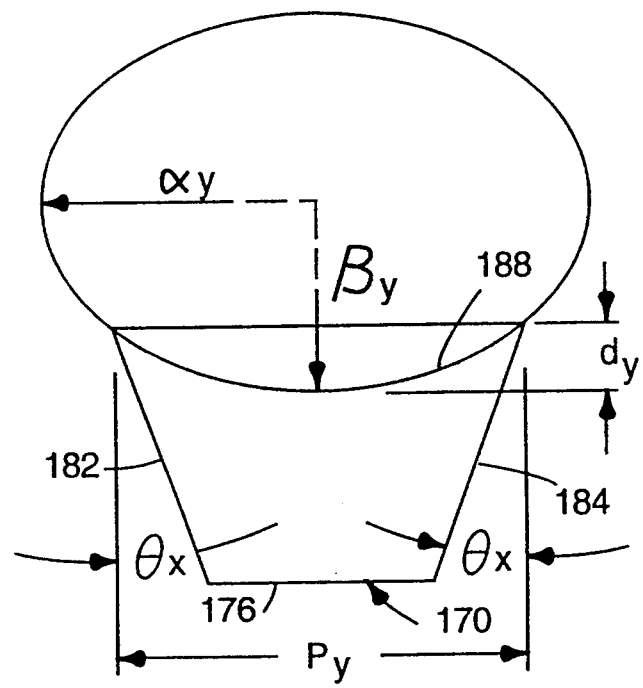

Perpendicular cross-sections of a receptacle 170 are shown in FIGS. 13 and 14. The receptacle 170 is defined by opposing walls 172 and 174 and opposing walls 182 and 184 and has a rectangular aperture having length $P_x$ and width $P_y$. Each of the opposing walls 172 and 174 converge toward each other at an angle of $\theta_y$ from the vertical as they approach the base 176 of the receptacle 170, as shown in FIG. 13. Similarly, the opposing walls 182 and 184 converge toward each other at an angle of $\theta_x$ from the vertical as they approach the base 176 of the receptacle 170, as shown in FIG. 14.

The equation for determining the appropriate profile of the arcuate grooves is a function of the length $P_x$ and width $P_y$ of the receptacle 170, the angles $\theta_x$ and $\theta_y$, and the desired lens sphere radius, $R_s$, of the desired lens. For the arcuate grooves cut into the walls 182 and 184, this profile is a portion of an ellipse 178 that intersects the tops of the walls 172 and 174, as shown in FIG. 13.

The desired lens sphere radius, $R_s$, may vary across the array (e.g., it may be shorter toward the center of the array than at the periphery if the microlenses at the center of the array have shorter focal lengths than those at the periphery). Therefore, the desired lens sphere radius, $R_s$, should be selected to yield optimum performance for the array as a whole.

The ellipse 178 has a semi-major axis $\alpha_x$ and a semi-minor axis $\beta_x$, and cuts into the walls 182 and 184 to a depth $d_x$ at the center of the walls. The arcuate groove that spans the receptacle 170 in the X-direction can be cut with a diamond tool that has the profile of the ellipse 178. The ellipse 178 is defined by the equation:

$$\alpha_x = \sqrt{R_S^2 - \left(\frac{P_x}{2}\cos\theta_x + \sqrt{R_S^2 - \frac{P_x^2 + P_y^2}{4}}\sin\theta_x\right)^2}$$

$$\beta_x = \alpha_x \cos\theta_x.$$

The tool will have its semi-major axis $\alpha_x$ parallel to the x direction, cut in the y direction, centered between the receptacle walls 172 and 174, and make a cut of depth, $d_x$, where $$d_x = \beta_x + \frac{P_x}{2}\sin\theta_x\cos\theta_x - \sqrt{R_S^2 - \frac{P_x^2 + P_y^2}{4}\cos^2\theta_x}$$

For the arcuate grooves cut into the walls 172 and 174, the profile of the arcuate grooves is a portion of an ellipse 188 that intersects the tops of the walls 182 and 184, as shown in FIG. 14. The ellipse 188 has a semi-major axis $\alpha_y$ and a semi-minor axis $\beta_y$, and cuts into the walls 172 and 174 to a depth $d_y$ at the center of the walls.

The arcuate groove that spans the receptacle in the y direction may be cut in a similar fashion with a diamond tool that has the profile of the ellipse 188. The ellipse 188 is defined by the equation:

$$\alpha_y = \sqrt{R_S^2 - \left(\frac{P_y}{2}\cos\theta_y + \sqrt{R_S^2 - \frac{P_x^2 + P_y^2}{4}}\sin\theta_y\right)^2}$$

-continued $$\beta_y = \alpha_y\cos\theta_y.$$

The tool will make a cut of depth, $d_y$, where $$d_y = \beta_y + \frac{P_y}{2}\sin\theta_y\cos\theta_y - \sqrt{R_S^2 - \frac{P_x^2 + P_y^2}{4}\cos^2\theta_y}$$

If the receptacle 170 were shaped like a square instead of a rectangle, (i.e., $P = P_x = P_y$), and assuming therefore that $\theta = \theta_x = \theta_y$, the equations for $\alpha, \beta$, and d would become:

$$\alpha = \alpha_x = \alpha_y = \sqrt{R_S^2 - \left(\frac{P}{2}\cos\theta + \sqrt{R_S^2 - \frac{P^2}{2}}\sin\theta\right)^2}$$

$$\beta = \beta_x = \beta_y = \alpha\cos\theta$$

$$d = d_x = d_y = \beta + \frac{P}{2}\sin\theta\cos\theta - \sqrt{R_S^2 - \frac{P^2}{2}\cos^2\theta}$$

If the aperture of the receptacle 170 were square-shaped and further had walls 172, 174, 182, and 184 which were vertical, then $\theta = 0$ and (because $\cos\theta = 1$ and $\sin\theta = 0$), $\alpha$ becomes equal to $\beta$, and the ellipse becomes a circle having a radius given by:

$$r = \alpha = \beta = \sqrt{R_S^2 - \frac{P^2}{4}}$$

The depth d therefore becomes:

$$d = r - \sqrt{R_S^2 - \frac{P^2}{2}}$$

Figure 15:
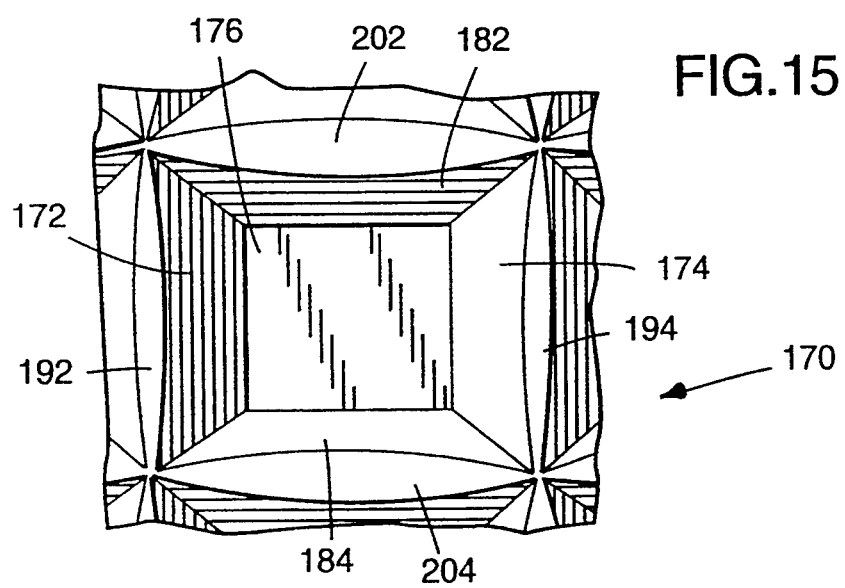
FIG. 15 is an overhead view of the receptacle shown in FIGS. 13 and 14.

An overhead view of the receptacle 170 that results from cutting the arcuate grooves into the receptacle is shown in FIG. 15. The receptacle 170 has areas 192, 194, 202, and 204 at the tops of the walls 172, 174, 182, and 184, respectively, which resemble the shape of an American football. The football-shaped areas 192, 194, 202, and 204 result from the fact that the walls 172, 174, 182, and 184 are not vertical, but rather they get fatter towards the base 176 of the receptacle 170. Thus the football-shaped areas 192, 194, 202, and 204 are wider at their centers because that is where the arcuate grooves are the deepest. The football-shaped areas 192, 194, 202, and 204 are defined by two symmetrical elliptical arcs, the ends of which terminate at the corners of the aperture of the receptacle 170. The middle of each arc curves toward the center of the aperture of the receptacle 170. The length of the area bounded by the elliptical arcs is large compared with its width. The length of the area is perpendicular to the direction of separation of adjacent microlenses.

If the arcuate grooves were cut into the walls defining receptacle apertures in the shape of equilateral triangles, equilateral hexagons, etc., the perimeter of the receptacle aperture would be a modified polygon in that each edge of the aperture would be an elliptical arc, the ends of which terminate at the corners of the polygon, where the middle of the arc curves toward the center of the aperture. Thus, a microlens array mold having the receptacles 170 would include a two-dimensional array of concave surfaces capable of forming a plurality of convex microlenses. Each concave surface would have a perimeter of the modified polygon described above. Similarly, microlenses made from this mold would also have the same perimeter.

Although the present invention has been described with reference to preferred embodiments, workers skilled in the art will recognize that changes may be made in form and detail without departing from the spirit and scope of the invention.

I claim:

1. A method of making a mold for forming an array of microlenses having variable focal lengths, comprising:
   (a) forming an array of receptacles having generally polygonal apertures, wherein the receptacles are not all of equal depth;
   (b) applying a shrinkable, hardenable liquid to the array of receptacles so that the receptacles are substantially filled with the liquid, whereby a plurality of menisci are formed in the receptacles; and
   (c) shrinking and hardening the liquid to form a plurality of concave lens mold surfaces in the receptacles, wherein deeper concave lens surfaces will result from deeper receptacles and shallower concave lens surfaces will result from shallower receptacles, thereby forming a mold capable of forming a microlens array having variable focal lengths.

2. The method of claim 1, wherein the depths of the receptacles vary as a function of their geometric position in the array, whereby the mold is capable of forming an array of microlenses having focal lengths which vary as a function of their geometric position in the array.

3. The method of claim 1, wherein the depths of the receptacles at the center of the array differ from the depths of the receptacles at the periphery of the array, whereby the focal lengths of the microlenses at the periphery of the array differ from the focal lengths of the microlenses at the center of the array.

4. The method of claim 1, wherein the depths of the receptacles located toward the center of the array are greater than the depths of the receptacles located at the periphery of the array, whereby the mold is capable of forming an array of microlenses having shorter focal lengths at the center of the array than at the periphery.

5. The method of claim 1, wherein step (a) comprises:
   providing a first plurality of parallel grooves in a substrate surface;
   providing a second plurality of parallel grooves in the substrate surface, wherein the second plurality of grooves intersects the first plurality of grooves, wherein the bottoms of both pluralities of grooves are coplanar, and wherein the entire substrate surface is not parallel to the plane of the bottoms of the grooves; and
   forming a negative replica of the substrate surface, thereby forming a first and second plurality of parallel raised walls corresponding to the first and second plurality of parallel grooves, whereby the pluralities of intersecting walls define an array of receptacles having generally polygonal apertures.

6. The method of claim 1, further comprising, after step (c), forming a negative replica of the concave lens mold surfaces, thereby forming convex lens mold surfaces capable of forming an array of generally spherical concave microlenses.

7. The method of claim 1, wherein the receptacle apertures are rectangular and are defined by a first plurality of parallel walls which are perpendicular to and intersect a second plurality of parallel walls, further comprising, before step Co), the steps of:
   providing a first plurality of arcuate grooves in the first plurality of parallel walls, wherein the arcuate grooves are parallel to the second plurality of parallel walls, and wherein each arcuate groove is centered between each pair of adjacent walls in the second plurality of parallel walls; and
   providing a second plurality of arcuate grooves in the second plurality of parallel walls, wherein the arcuate grooves are parallel to the first plurality of walls, and wherein each arcuate groove is centered between each pair of adjacent walls in the first plurality of parallel walls.

8. A method of making an array of microlenses having variable focal lengths, comprising:
   (a) forming an array of receptacles having generally polygonal apertures, wherein the receptacles are not all of equal depth;
   (b) applying a shrinkable, hardenable liquid to the array of receptacles so that the receptacles are substantially filled with the liquid, whereby a plurality of menisci are formed in the receptacles;
   (c) shrinking and hardening the liquid to form a plurality of concave lens mold surfaces in the receptacles, wherein deeper concave lens surfaces will result from deeper receptacles and shallower concave lens surfaces will result from shallower receptacles, thereby forming a mold capable of forming a microlens array having a variable focal length;
   (d) applying a hardenable lens material to the array; and
   (e) hardening the lens material, thereby forming an array of microlenses having variable focal lengths.

* * * * *

UNITED STATES PATENT AND TRADEMARK OFFICE
CERTIFICATE OF CORRECTION

PATENT NO. : 5,439,621
DATED : August 8, 1995
INVENTOR(S) : Timothy L. Hoopman

It is certified that error appears in the above-indentified patent and that said Letters Patent is hereby corrected as shown below:

Column 1, line 43, "Hamaria" should read --Hamada--.

Column 2, line 49, "pans" should read --parts--.

Column 3, line 3, "my" should read --ray--.

Column 3, line 68, "Which" should read --which--.

Column 8, lines 52 & 53, "comer" should read --corner--

Column 12, line 20, "Co)" should read --(b)--.

Signed and Sealed this

Twentieth Day of February, 1996

Attest:

Attesting Officer

BRUCE LEHMAN
Commissioner of Patents and Trademarks